United States Patent
Labbe et al.

(10) Patent No.: US 9,450,461 B2
(45) Date of Patent: Sep. 20, 2016

(54) ROTATING ELECTRICAL MACHINE, FOR STARTER

(75) Inventors: Nicolas Labbe, Lyons (FR); Philippe Tesson, Marseilles (FR); Benoit Dupeux, Oyeu (FR); Aurélien Vauquelin, Saint Maur des Fosses (FR); Jean-Paul Vilain, Melicocq (FR)

(73) Assignee: Valeo Equipements Electriques Moteur (FR)

( * ) Notice: Subject to any disclaimer, the term of this patent is extended or adjusted under 35 U.S.C. 154(b) by 702 days.

(21) Appl. No.: 13/641,513

(22) PCT Filed: Apr. 22, 2011

(86) PCT No.: PCT/FR2011/050938
§ 371 (c)(1),
(2), (4) Date: Apr. 23, 2013

(87) PCT Pub. No.: WO2011/135244
PCT Pub. Date: Nov. 3, 2011

(65) Prior Publication Data
US 2013/0207488 A1    Aug. 15, 2013

(30) Foreign Application Priority Data
Apr. 27, 2010  (FR) ..................... 10 53224

(51) Int. Cl.
*H02K 1/22* (2006.01)
*H02K 1/17* (2006.01)
*H02K 1/04* (2006.01)
(Continued)

(52) U.S. Cl.
CPC *H02K 1/22* (2013.01); *H02K 1/04* (2013.01); *H02K 1/17* (2013.01); *H02K 1/26* (2013.01); *H02K 3/47* (2013.01); *H02K 23/04* (2013.01);
(Continued)

(58) Field of Classification Search
CPC ............ H02K 1/04; H02K 1/17; H02K 1/02; H02K 1/22; H02K 1/26; H02K 23/04; H02K 23/26; H02K 23/40; H02K 23/58; H02K 3/47
USPC ......... 310/43, 154.28, 216.002, 156.23, 235, 310/233
See application file for complete search history.

(56) References Cited

U.S. PATENT DOCUMENTS 3,212,170 A * 10/1965 Marshall .................... 29/598
3,320,451 A *  5/1967 Wiley .................... 310/216.042
(Continued)

FOREIGN PATENT DOCUMENTS

CH       620 551      11/1980
FR      2 910 192      6/2008
(Continued)

*Primary Examiner* — Alex W Mok
(74) *Attorney, Agent, or Firm* — Berenato & White, LLC (57) ABSTRACT

A rotating electric machine comprising a rotor (2) comprising a body (34) on the periphery of which are installed conductors (36) forming the winding, and a stator (3) positioned around the rotor (2) comprising a magnetized structure extending along a circumference of the stator (3). The body (34) of the rotor (2) is made partially of plastic, in the region of the teeth which conventionally separate the notches near the air gap, on the periphery of the armature. A modified structure of magnets of Halbach type is made with magnets of NdFeB type to reduce the thickness of the stator (3), to increase the radius (R2) of the rotor (2) so as to position all the conductors (36) on the periphery of the body (34) of the rotor (2) on one and the same layer at a diameter of maximum value.

16 Claims, 5 Drawing Sheets

(51) Int. Cl.
*H02K 1/26* (2006.01)
*H02K 3/47* (2006.01)
*H02K 23/04* (2006.01)
*H02K 23/26* (2006.01)
*H02K 23/40* (2006.01)
*H02K 23/58* (2006.01)
*H02K 1/02* (2006.01)

(52) U.S. Cl.
CPC ............. *H02K 23/26* (2013.01); *H02K 23/40* (2013.01); *H02K 23/58* (2013.01); *H02K 1/02* (2013.01)

(56) References Cited

U.S. PATENT DOCUMENTS

| | | | | |
|---|---|---|---|---|
| 3,697,792 | A * | 10/1972 | Roue | H02K 13/04 310/234 |
| 4,263,711 | A * | 4/1981 | Sakano et al. | 29/597 |
| 4,321,494 | A * | 3/1982 | MacNab | H02K 3/00 310/179 |
| 4,386,291 | A | 5/1983 | Herr | |
| 4,973,872 | A * | 11/1990 | Dohogne | 310/156.28 |
| 5,536,985 | A | 7/1996 | Ward et al. | |
| 5,615,618 | A * | 4/1997 | Berdut | 104/290 |
| 5,619,084 | A * | 4/1997 | Lau | 310/154.14 |
| 6,946,758 | B2 * | 9/2005 | Du et al. | 310/43 |
| 2004/0263021 | A1 * | 12/2004 | Irwin et al. | 310/215 |
| 2006/0125345 | A1 | 6/2006 | Lee | |
| 2007/0114867 | A1 * | 5/2007 | Marioni | 310/156.23 |
| 2009/0267436 | A1 * | 10/2009 | Stiesdal | 310/156.23 |

FOREIGN PATENT DOCUMENTS

| | | | |
|---|---|---|---|
| JP | 63 023523 | 1/1988 | |
| JP | 03082351 A * | 4/1991 | H02K 1/27 |

* cited by examiner

ROTATING ELECTRICAL MACHINE, FOR STARTER

CROSS-REFERENCE TO RELATED APPLICATIONS AND CLAIM TO PRIORITY

This application is a national stage application of International Application No. PCT/FR2011/050938 filed Apr. 22, 2011, which claims priority to French Patent Application No. 10/53224 filed Apr. 27, 2010, of which the disclosures are incorporated herein by reference and to which priority is claimed.

FIELD OF THE INVENTION

The invention relates to a rotary electrical machine, the operating characteristics of which have been optimised. The invention has a particularly advantageous application in the field of motor vehicle starters.

PRIOR ART

Motor vehicle starters are known which implement rotary electrical machines provided with a stator or inductor consisting of a head and a magnetised structure with a plurality of permanent magnets which are generally made of ferrite.

The machine also comprises a rotor, or armature, comprising conductors which form the winding of the rotor. For this purpose, according to one embodiment, the rotor comprising a core formed by laminated metal plates has longitudinal notches which are separated by teeth, conductors in the form of a "U" being inserted in these notches on two distinct layers, i.e. a lower layer and an upper layer. The core, which constitutes the body of the rotor, is integral with a metal shaft.

It is known that in a system of this type, losses of iron are associated with the variation of the magnetic field, in the rotary parts, in particular in the rotor teeth where the level of induction and saturation is very great. In document US 2006/0125345, according to the preamble of claim 1, these losses of iron are limited by providing the core of the rotor with a plurality of teeth made of non-magnetic material in order to eliminate the noise and vibrations. In document U.S. Pat. No. 5,536,985, the core made of laminated metal plates is eliminated and is replaced by a composite core comprising a plurality of magnetic particles which are connected by a non-magnetic bonding agent.

It is desirable to have good magnetic coupling between the inductor and the armature of the rotary electrical machine, without the induction being too great in the areas where there may be losses of iron during the rotation of the armature.

OBJECT OF TIRE INVENTION

In order to fulfil these requirements, a rotor is produced which is made partially of plastic material. Thus the rotor can have a body which is made of two parts, i.e. an inner part which is in the form of a set of metal plates and an outer part made of plastic material in which the conductors are embedded. The conductors can be positioned on the periphery of the rotor on two distinct layers or on a single layer. It will be appreciated that the inner part permits the passage of the magnetic flow which is generated by the magnetised structure.

In order to compensate for the decrease in the drive torque which is derived from the elimination of the ferromagnetic material on the armature, it is possible to replace the ferrite magnets which are conventionally used in order to form the inductor stator by magnets made of sintered NdFeB. This will make it possible to reduce the thickness of the magnets of the stator, and consequently, for the same diameter of the stator, to increase the diameter of the rotor in order to be able to position all the conductors easily on the periphery of the rotor, on a single layer.

It is also possible to use a stator provided with a modified permanent magnet structure of the Halbach type with radially augmented portions. According to this structure, the dimensions of the head of a conventional stator are retained, and the magnets are adapted by dividing their thickness substantially by 2. This results in a localised Halbach effect which makes it possible to assure magnetic transition from one pole to another in order to concentrate the magnetic energy of the inductor on which there is superimposed a radial magnetisation system which makes it possible to optimise the passage of flow towards the conductors of the rotor.

It is also possible to use an inductor of the partial Halbach type which is completed by steel interpolar parts which make it possible increase the inductance of the armature.

The invention thus permits in particular:
increase of the performance of the electrical machine by means of decrease of the losses of iron (Foucault currents, hysteresis), and virtual elimination of the losses caused by switching, since the inductance of the armature is greatly reduced;
facilitation of the process of production of the rotor, since there is no longer any concern about electrical isolation between the conductors and the metal plates of the rotor which are connected to the ground;
improvement of the voltage performance in terms of use of current, as a result of the lower inertia in rotation. This constitutes a major concern for "stop and start" technology, wherein the engine is stopped at a red light and is then restarted;
elimination of the magnetic noise, since the edges of the poles of the inductor can no longer be subjected to alternance of tooth—notch reluctance during the rotation of the armature; and—elimination of any magnetic saturation associated with the armature (saturation which is conventionally associated with the steel teeth which separate the notches).

The invention thus relates to a rotary electrical machine comprising:
a rotor which is fitted on a metal shaft comprising a body on the outer periphery of which there are installed conductors which form a winding of the said rotor;
a stator which is positioned around the rotor, comprising a magnetised structure with permanent magnetisation, which extends according to a circumference of the stator, the rotor and the stator being separated by an air gap, characterised in that
the body of the rotor is made partially of plastic material and comprises an inner part in the form of an inner set of metal plates and an outer part made of plastic which is over-moulded around the set of metal plates.

According to one embodiment, the rotor is made of plastic material in the region of the teeth which separate the notches close to the air gap, on the outer periphery of the rotor.

According to one embodiment, the body has on its inner periphery a hole with a projection, with a protuberance associated with the metal shaft penetrating in a complementary manner into the projection.

According to one embodiment, this protuberance is a key which intervenes between a hollow provided on the outer periphery of the shaft and the projection, or which belongs to the shaft.

According to one embodiment, the set of metal plates comprises on its outer periphery anchorage means, such as grooves, in order to retain the outer part made of plastic material.

According to one embodiment, the set of metal plates comprises on its outer periphery protuberances, such as grooves, in order to retain the outer plastic part.

According to one embodiment, the set of metal plates comprises on its outer periphery recesses, such as semi-closed notches, in order to retain the outer plastic part.

According to one embodiment, the outer part made of plastic material has at each of its axial ends a rim which faces towards the interior in the direction of the axis of the rotor, with the set of metal plates being sandwiched between the rims, such that the part is blocked axially by the set of metal plates, thus forming a brace between the rims.

According to one embodiment, the rim has an annular form or is divided.

According to one embodiment, the conductors are positioned on a single layer.

According to one embodiment, the conductors are embedded in the plastic of the rotor body.

According to one embodiment, the conductors have a transverse cross-section with an elongate form, which for example is substantially rectangular.

According to one embodiment, the cross-sections of the conductors are oriented radially according to their large dimension.

According to one embodiment, the conductors are positioned staggered on the periphery of the rotor.

According to one embodiment, the conductors are situated side by side as far as possible from the axis of rotation, in order to form a sheet of current on the outer periphery of the rotor.

According to one embodiment, the plastic which is used to produce the rotor is a plastic of the PEEK (polyether ether ketone) type.

According to one embodiment, the stator is constituted by a head for stoppage of the flow and by an assembly of permanent magnets made of rare earth which have a radial direction of magnetisation.

According to some embodiments, the rare earth magnets are based on neodymium, iron, boron (NdFeB) or on samarium cobalt.

According to one embodiment, the stator comprises:
magnetised regions having magnetisation with a radial direction which defines the poles of the machine;
regions of magnetic transition having a direction of magnetisation other than radial which are situated between two regions of radial magnetisation;
the regions of radial magnetisation occupying a radial zone which is more extensive than the radial zones occupied by the regions of magnetisation other than radial.

According to one embodiment, between two consecutive magnets which have radial magnetisation, the regions of magnetisation other than radial are constituted by:
a region of magnetisation which is substantially ortho-radial; and
on both sides of this region, two regions which have a direction of magnetisation different from the radial and ortho-radial directions, this direction of magnetisation forming for example with the radial direction an angle of approximately 45°.

According to one embodiment, the stator additionally comprises steel interpolar parts which are interposed radially between two successive poles of the stator.

According to one embodiment, the steel interpolar parts replace the ortho-radial magnetisation regions.

According to one embodiment, the steel interpolar parts have a parallelepiped form or a form of an arch.

The invention also relates to a starter equipped with an electrical machine according to the invention.

BRIEF DESCRIPTION OF THE DRAWINGS

The invention will be better understood by reading the following description and by examining the figures which accompany it. These figures are provided simply by way of illustration of the invention which is in no way limiting. They show.

Elements which are identical or analogous retain the same references from one figure to another.

DESCRIPTION OF EMBODIMENTS OF THE INVENTION

Figure 1:
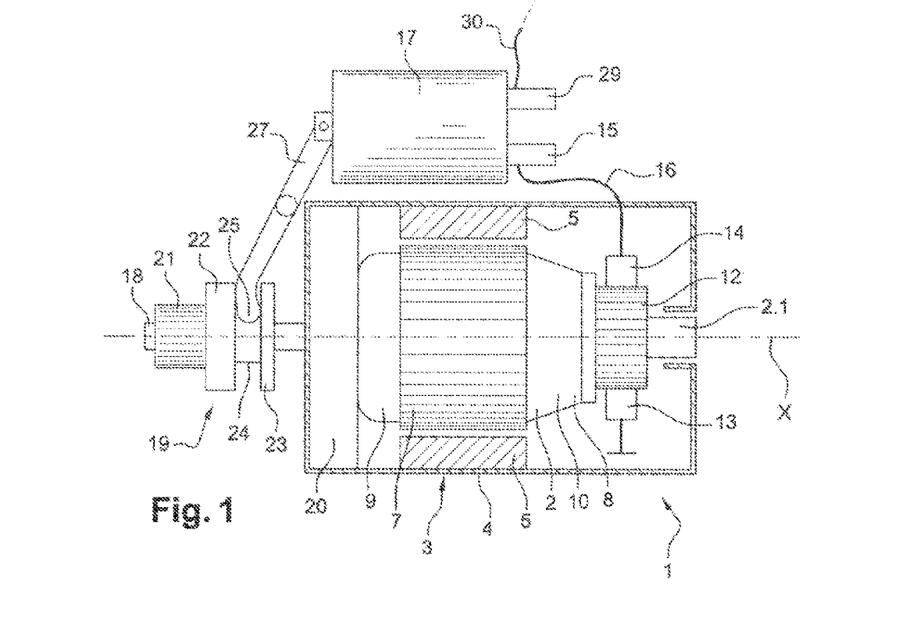
FIG. 1: a schematic representation of a starter according to the invention.

FIG. 1 shows a schematic representation of a starter 1 for a motor vehicle combustion engine. This starter 1 comprises an electric motor comprising firstly a rotor 2, which is also known as an armature, fitted integrally on a metal shaft 2.1 with an axis of rotation X, and secondly a stator 3, which is also known as an inductor, installed around the rotor 2 with the presence of an air gap. This stator 3 comprises a metal head 4 which bears a magnetised structure 5 with permanent magnetisation. The rotor 2, which has an annular form comprises a rotor body 7 which is integral with the shaft 2.1, and a winding 8 which is thrilled by conductors 36 (shown in FIG. 2) installed on the outer periphery of the rotor 2.

In the example illustrated, the rotary electrical machine, formed by the starter 1, is of the type with six poles. On both sides of the body of the rotor 7, the winding 8 forms a front chignon 9 and a rear chignon 10. At the rear, the rotor 2 is provided with a collector 12 comprising a plurality of contact parts, in this case electrically conductive plates such as copper plates, connected electrically to the conductive elements, which in the example considered are formed by wires, of the winding 8. The plates of the collector are supported by a support made of plastic material which is integral with the shaft. For good resistance to temperature, the support of the collector is made of a thermo-setting material, such as a phenolic thermo-setting material, for example Bakelite.

A group of brushes 13 and 14, in this case radial, is provided for the electrical supply of the winding 8, one of the brushes 13 being connected to the ground of the starter 1 and another one of the brushes 14 being connected to an electric terminal 15 of a contactor 17 via a wire 16. There are for example four brushes. The brushes 13 and 14 rub on the plates of the collector 12 when the rotor 2 is rotating, thus permitting the supply of the winding 8 of the rotor 2 by switching of the electric current in sections of the rotor 2. The number of brushes 13, 14 depends on the applications, one or a plurality of pairs of brushes 13, 14 being able to be provided.

The starter 1 additionally comprises a launcher assembly 19 which is fitted in a sliding manner on a drive shaft 18 which is designed to be rotated around the axis X by the rotor 2 when the winding 8 of the latter is supplied electrically. A speed-reducer assembly 20 is interposed, between the shaft 2.1 of the rotor 2 and, the drive shaft 18, in a known manner. As a variant, the starter 1 can be of the "Direct Drive" type, without a speed reducer. The shaft 18 is thus distinct from, or combined with, the shaft 2.1 of the rotor 2.

The launcher assembly 19 comprises a drive element 21 which is designed to engage on a drive unit of the combustion engine, not represented. According to one embodiment, this drive unit is a pulley 21 which receives a belt which co-operates with a pulley of the crankshaft of the combustion engine. According to another embodiment the drive shaft 21 is a gear element, mostly a pinion, which is configured to rotate a toothed starter ring which is connected in a rigid or resilient manner to the crankshaft of the combustion engine. The launcher assembly 19 additionally comprises in a known manner a driver 23 and a free wheel 22, for example with rollers, which is interposed between the driver 23 and the drive element 21. The driver 23 has a sleeve which is provided on its inner periphery with grooves with a helical form which engage with complementary grooves with a helical form provided on the outer periphery of the shaft 18.

The free wheel 22 and the driver 23 are configured to have a channel 24 for receipt of the lower end 25 of a fork 27 for actuation of the launcher assembly 19. In a known manner, this fork 27 has an intermediate pivoting point and an upper end which is connected in an articulated manner to a rod which is connected to the mobile core of an electromagnetic contactor 17. This mobile core is designed to act on a thruster which supports a mobile contact in the form of a small plate which is designed to come into contact with the terminal 15 connected to the brush 1 and with a terminal 29 connected via an electrical connection element, in particular a wire 30, to an electrical supply of the vehicle, and in particular a battery. For farther details on the contactor 17 and in general on the starter, reference will be made for example to document U.S. Pat. No. 7,375,606, in the knowledge that the head of the electric motor belongs to the housing of the starter.

This fork 27 is produced for example by moulding a plastic material. The fork 27 is designed to be actuated by the mobile core of the contactor 17 in order to displace the launcher assembly 19 relative to the drive shaft 18, according to the axis X, between a first position in which the mobile contact of the contactor 17 is in contact with the terminals 15, 29, and supplies the winding 8 of the rotor 2 electrically in order to rotate the rotor 2 and to drive the drive unit of the combustion engine by means of its drive element 21, and a second position in which the launcher assembly 19 is disengaged from the drive unit of the combustion engine, and the mobile contact is disengaged from the terminals 15, 29.

Figure 2:
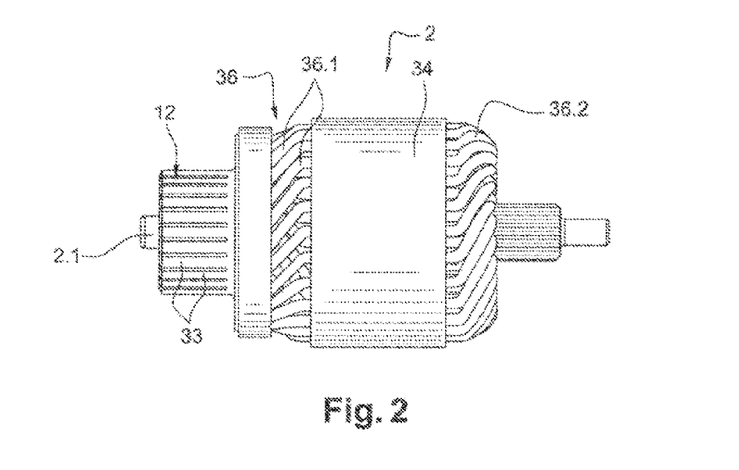
FIG. 2: a lateral view of a rotor of a machine according to the invention made partly of plastic.

FIG. 2 shows a lateral view of the rotor 2 according to the invention. This rotor 2 fitted on the shaft 2.1 supports the collector 12 of the so-called "drum" type. This collector 12 has the electrically conductive plates with the reference 33 on which the brushes 13, 14 rub. The rotor 2 comprises a body 34, also known as a core, on the outer periphery of which the conductors 36 are installed in order to form the winding 8. In this case, each conductor 36 is covered with an electrically insulating layer, such as enamel, and has two branches 36.1 which are connected by a base 36.2 such as to form a "U", the ends of these conductors 36 being welded onto the plates 33. According to one embodiment, the plates 33 and the conductors 36 are made of copper. It will be noted that there is the presence of a hoop (with no reference) at the level of the ends of the branches 36.1, in order to prevent separation of the conductors 36 relative to the plates under the effect of the centrifugal force.

In a known manner, the magnetised structure 5 of the stator 3 creates a magnetic field which is propagated in the rotor 2. According to one characteristic, the body 34 with an annular form is at least partially made of plastic material in order to reduce the losses in the magnetic circuit which are known as losses of iron, i.e. the losses by means of Foucault current and the losses by means of hysteresis when the rotor 2 is rotating. This therefore makes it possible to increase the performance and the torque of the electric motor, and also to reduce the noises, facilitate the design of the rotor 2, reduce the inertia of the rotor 2, and in particular spare the wear of the electric motor of the starter.

Figure 3:
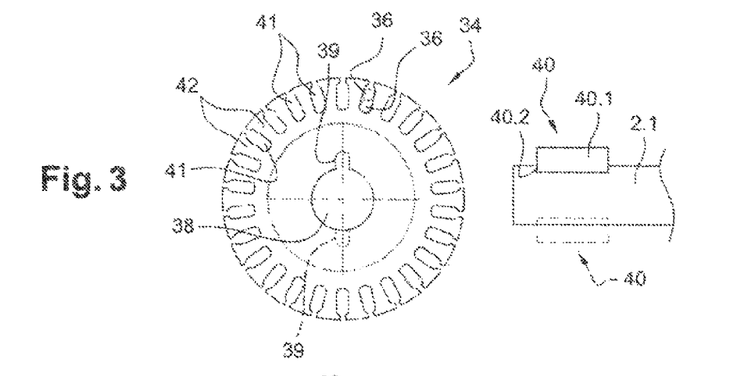
FIG. 3: a from view of a rotor of a machine according to the invention with notches on its outer periphery.

According to a first embodiment of the invention shown in FIG. 3, in order to limit the losses of iron and reduce the inertia of the rotor as far as possible, the body 34 is made partially of plastic material, whilst the metal shaft 2.1 passes through it centrally. The body 34 has on its inner periphery a hole 38 with a projection 39. The hole 38 is dedicated to the passage of the shaft 2.1, with a protuberance 40 associated with the metal shaft 2.1 penetrating in a complementary manner into the projection 39, in order to rotate the body 34. According to one embodiment, this protuberance 40 is a key 40.1 which intervenes between a hollow 40.2 provided on the outer periphery of the shaft 2.1 and the projection 39. As a variant, the protuberance 40 belongs to the shaft 2.1. As a variant, no projection 39 is provided. With the shaft 2.1 being grooved as can be seen partially in FIG. 2, the body 34 of the rotor is forced onto the shaft 2.1, in order to be retained integrally in rotation with the shaft 2.1. The protuberance 40 and the grooves also permit an axial connection of the body 34 with the shaft 2.1, in the knowledge that the grooves of the shaft create furrows in the body 34 with formation of an end flange. In this embodiment, as in FIGS. 4 to 8a-8b, the body 34 is in two, respectively outer and inner parts with the references 48 and 49 in FIGS. 9a-9b and 10. These figures represent a circle which separates these two parts, in the knowledge that according to one characteristic, the outer part is made of plastic material over-moulded around the inner part in the form of a set of metal plates so as to completely cover the set of metal plates. The projection 39 belongs to the inner part 48.

As a variant, the body 34 comprises at least two diametrically opposed projections 39 which are represented in broken lines, for good balancing of the shaft 2.1. These projections 39 are designed to co-operate with the form of the corresponding protuberances 40 which are supported by the shaft 2.1. In all cases, it is possible to provide two channels in the shaft into which the material of the ends of the body 34 penetrates, in order to block the body 34 axially relative to the shaft 2.1.

According to this embodiment, the outer part made of plastic material of the body 34 has on its outer periphery an alternation of notches 41 and teeth 42. The rotor 2 thus has notches 41 which are provided on the outer periphery of its body 34, and are separated by the teeth 42 made of plastic material. The conductors 36 can be inserted in the notches 41 on two layers, i.e. an upper layer and a lower layer. According to this configuration, the branches of the conductors 36 are situated at different radial distances from the axis of rotation of the rotor 2.

Figure 4:
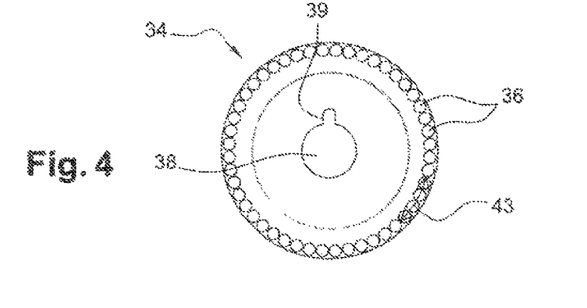
FIG. 4: a front view of a rotor of a machine according to the invention wherein the conductors are positioned at its periphery on a single layer.

As a variant, as represented in FIG. 4, all the conditions 36 are positioned on a single layer 43 on the outer periphery of the outer part of the body 34, in order to maximise the moment of the Laplace forces which are produced by the conductors 36, and to increase further the torque of the electric starter motor.

Figure 5:
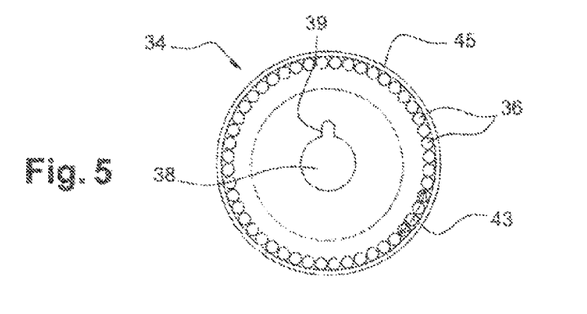
FIG. 5: a front view of a rotor of a machine according to the invention wherein the conductors positioned at its periphery are retained by a hoop.

As represented in FIG. 5, the conductors 36 can be placed against the outer periphery of the body 34 (i.e. the outer periphery of the outer part), and can be retained radially by a hoop 45 in order to prevent the effects of the centrifugal force from being exerted on these conductors 36. Alternatively, the conductors 36 are embedded in the plastic of the body 34.

Figure 6:
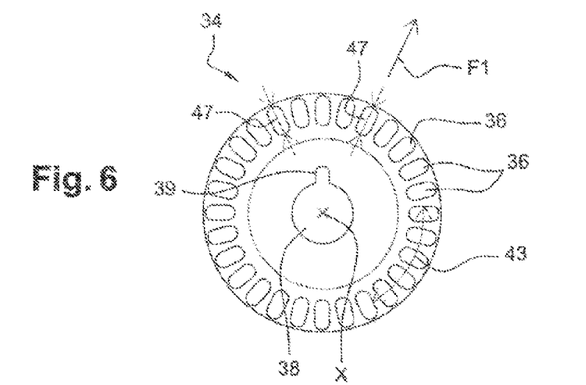
FIG. 6: a front view of a rotor of a machine according to the invention wherein the conductors with a flattened form have a radial orientation.

The conductors 36 can have a round cross-section, as represented in FIGS. 3 to 5, or a flattened form with a transverse cross-section which is elongate, and is for example substantially rectangular, in order to maximise the heat exchange surface between the conductors, and, if applicable, the mass of the rotor 2. These conductors 36 can be oriented according to their large dimension 47 radially according to the direction F1, as represented in FIG. 6.

Figure 7:
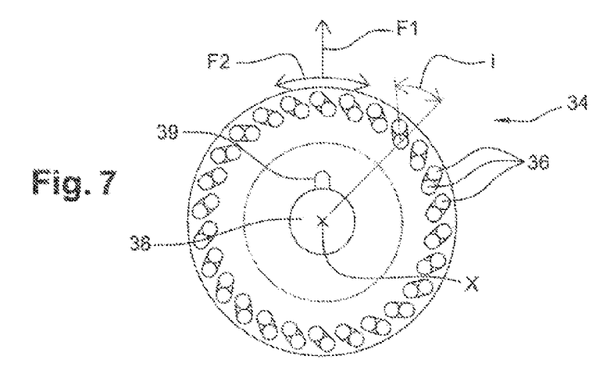
FIG. 7: a front view of a rotor of a machine according to the invention wherein the conductors are positioned on two distinct staggered layers.
Figure 8A:
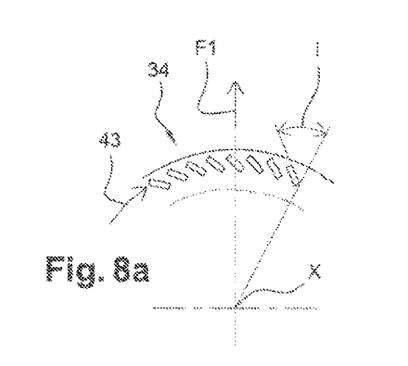
FIGS. 8a-8b: a partial view of the periphery of the rotor of the machine according to the invention, wherein the conductors which have a flattened form are positioned respectively staggered or according to an ortho-radial direction.

As a variant, as represented in FIGS. 7 and 8a, these conductors 36 on one or two layers can be positioned staggered, the conductors 36 then having an inclination i which is variable between the radial direction F1 and an ortho-radial direction F2 which is substantially perpendicular to the direction F1. For this purpose, the body 34 of the rotor 2 can be provided with inclined notches on its periphery.

Figure 8B:
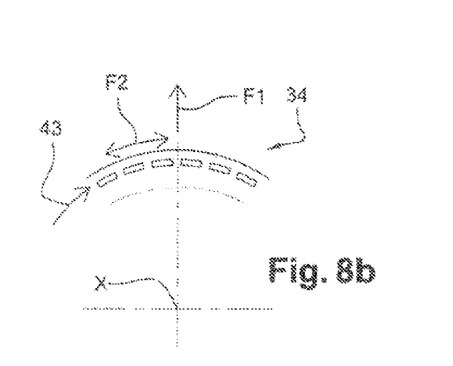

In the extreme situation, as represented in FIG. 8b, in the ortho-radial direction F2, the flattened conductive regions are situated adjacent to one another as far as possible from the axis X of rotation, in order to form a sheet of current on the periphery of the rotor 2.

Figures 9A, 9B, 10, 11:
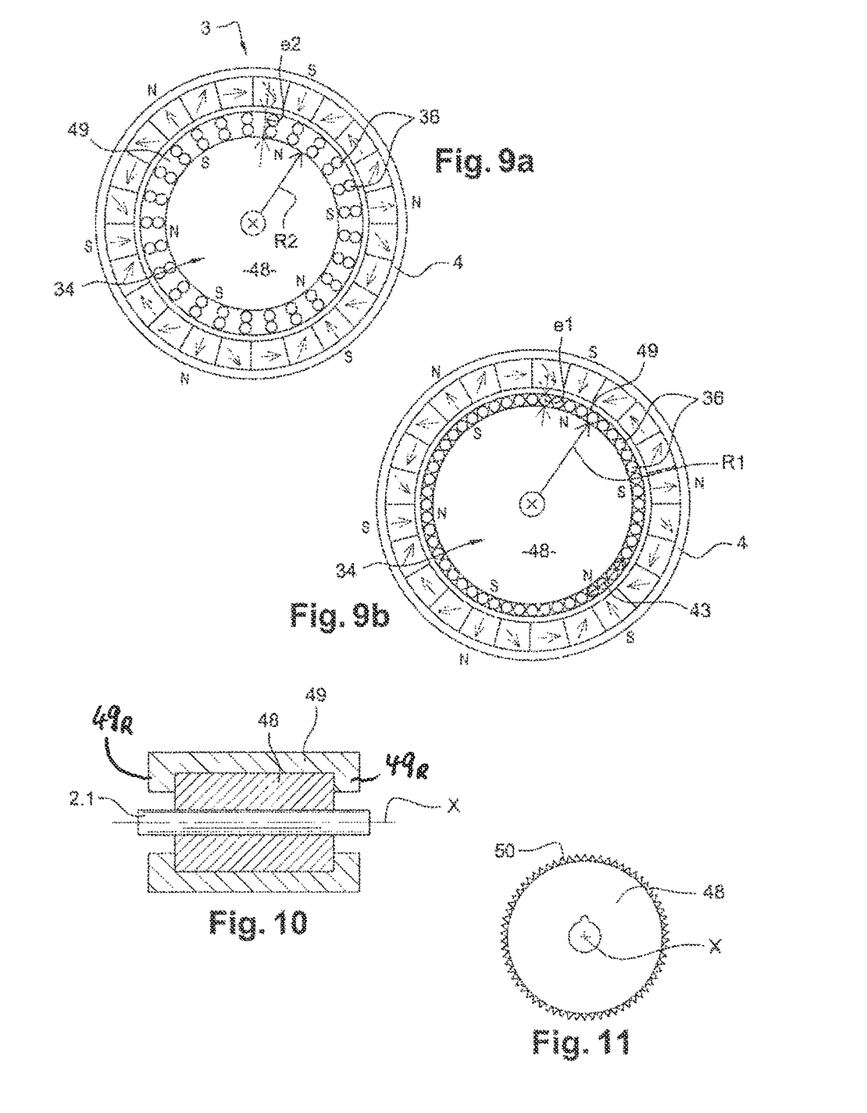
FIGS. 9a-9b: front views of a rotor according to the invention with a core made of metal plates and an over-moulded plastic part, wherein the conductors are embedded in the plastic part on two layers or a single layer.
FIG. 10: a schematic lateral view of the rotor of the machine in FIGS. 9a-9b.
FIG. 11: a front view of the metal core of the rotor in FIGS. 9 and 10 comprising grooves on its outer periphery.

According to another embodiment of the invention, shown in FIGS. 9a-9b and 10, the body 34 of the rotor is in two parts as in the preceding figures, i.e. an inner laminated part 48 in the form of a set of metal plates, and an outer plastic part 49 which is over-moulded around the set of metal plates 48 so as to completely cover the set of metal plates 48. An embodiment of this type makes it possible to obtain good magnetic coupling between the inductor stator 3 and the armature 2, without the induction being too high in the areas where there can be losses of iron during the rotation. The outer part 49 is non-magnetic, and makes it possible to lighten the rotor, whereas the inner part 48 makes it possible to reduce the Foucault currents, whilst having a good mechanical connection between the shaft and the body of the rotor. This inner part also permits the passage of the magnetic flow. Preferably, in order to retain the plastic part 49, the set of metal plates 48 has grooves 50 which extend longitudinally on its outer periphery, as represented in FIG. 11. The grooves 50, which in this case are in the form of teeth, are anchored in the central opening in the part 49, this opening constituting the inner periphery of the part 49. The set of metal plates 48 is connected in rotation to the shaft 2.1 in a conventional manner by means of grooves in particular. These grooves can be seen in the aforementioned manner in FIG. 2.

It will be noted that in the embodiment in FIG. 10, the outer part 49 made of plastic material, in which the conductors 36 are embedded, has on each of its axial ends a rim $49_R$ which faces towards the interior and extends radially inwardly, i.e. in the direction substantially perpendicular to the axis X. According to one embodiment, the rim has an annular form. The set of metal plates is thus sandwiched between the rims, such that the part 49 is blocked axially by the set of metal plates which thus forming a brace between the rims. As a variant, the rim is divided. It will be appreciated that the arrangements in FIGS. 9a-9b to 11 are applicable to the embodiments in FIGS. 3 to 8a-8b and 12 to 15 described hereinafter.

As previously, the conductors 36 can be positioned on two layers on the outer periphery of the body 34 of the rotor (cf FIG. 9a), or on a single layer 43 (cf FIG. 9b). Depending on the applications the radius R1, R2 of the set of metal plates 48 varies, and is larger when the conductors 36 are positioned on a single layer (cf radius R1) than when they are positioned on two layers (cf radius R2). In one example, in which the diameter of the rotor is 60 mm, the inner set of metal plates 48 has a radius R2 of approximately 20 mm, whereas the outer part 49 made of plastic material with two layers has a thickness e1 of approximately 10 mm. In another example, the set of metal plates 48 has a radius R1 of approximately 25 mm, whereas the part 49 made of plastic material with a single layer has a thickness e2 of approximately 5 mm. In this example, the outer diameter of the stator, and more particularly of its metal head 52, is 71 mm.

The plastic which is used for the production of the outer part 49 of the body 34 of the rotor 2 is a thermo-setting plastic material which has good resistance to heat. This thermo-setting plastic material is for example a phenolic thermo-setting plastic material, such as Bakelite, such that, according to one embodiment, the body 34 is made of the same material as the support of the plates of the collector, and according to one embodiment is produced in a single piece with the body. As a variant, use is made of a thermo-setting plastic material based on styrene. According to another embodiment it is possible to use aplastic material of the PEEK (polyether ether ketone) type, which has excellent resistance to temperature.

The plastic material of the body 34 can thus be the same plastic material as that of the support for the plates of the collector, or different from that of this support. According to one embodiment, the body 34 is produced in a single piece with this support, or as a variant it is distinct from this support. It will be noted that the rotor with a body which at least partially made of plastic material is lighter, and this is advantageous in the case when the starter for a motor vehicle with a combustion engine carries out the "Stop Start" function (stoppage of the combustion engine for example at a red light, then restarting of the combustion engine). The plastic material spares the covering of the conductors 36, since it is less aggressive than the burr of a rotor body which is made of a set of metal plates. When the body 34 comprises an inner set of metal plates, this makes it possible to channel the magnetic field well, in particular so that the magnetic field passes radially through the conductors 36, in the manner described hereinafter.

Figures 12, 13A, 13B:
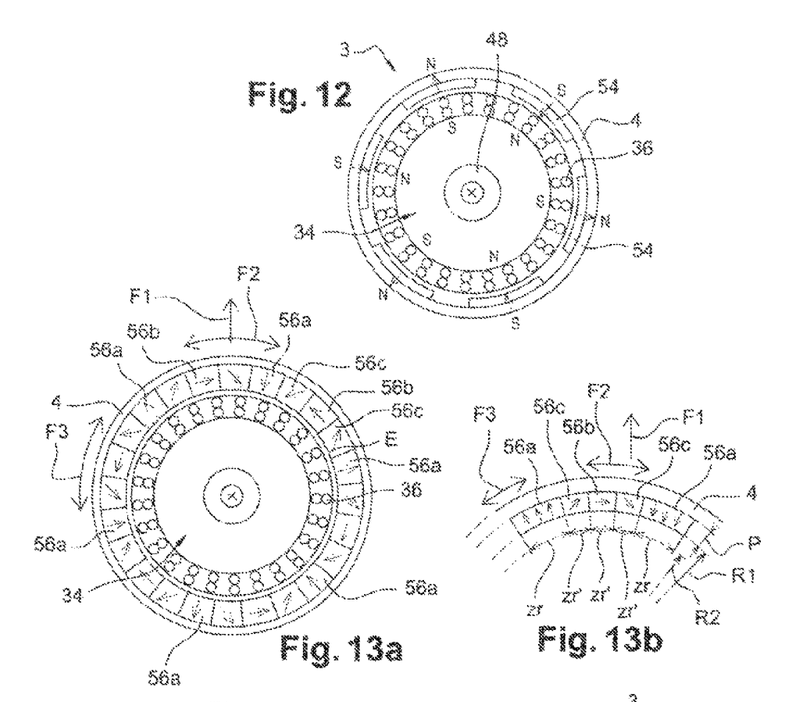
FIG. 12: a front view of a stator of the machine according to the invention with 6 poles, comprising magnets made of NdFeB.
FIGS. 13a-13b: schematic representations respectively of a stator comprising a known magnetised structure of the Halbach type and a stator according to the invention comprising a modified Halbach structure with regions of augmented radial magnetisation.

As represented in FIG. 12, the inductor 3 is constituted by a metal head 4 for stoppage of flow, which for example is made of iron and surrounds a set of permanent magnets 54 with radial magnetisation, thus defining the poles of the inductor 3. The rotor 2 and the stator 3 are separated from one another by an air gap E. The stator 3 can additionally comprise in a known manner magnetic shunts consisting of steel segments juxtaposed with the magnets 54. The magnets 54 will preferably be rare earth magnets, for example of the NdFeB (neodymium iron boron) type, which generate a magnetic field very much larger than that of magnets of the ferrite type. This type of magnet thus makes it possible to reduce the thickness of the magnets 54 used, which permits the increase in the diameter of the rotor 2 in order to allow the conductors 36 to be positioned on a single layer. Thus, for the same outer diameter of the head, it is possible to increase the outer diameter of the rotor 2. For example, with an outer diameter of the head of 71 mm, the outer diameter of the rotor can be in the aforementioned manner 60 mm compared with 57 mm in the prior art. It can be noted that the proportion of the thicknesses of the magnets 54 and of the head 4 is such that the thickness is smaller on the magnet 54 side, and larger on the head 4 side.

The invention can be implemented with an inductor 3 which is provided with a magnetised structure of the radial type (FIG. 12) or of the Halbach type described in document FR A 2 910 192, or of the modified Halbach type (FIGS. 13b to 15). Just like the preceding FIGS. 9a-9b, FIG. 13a shows a stator 3 which implements a magnetised structure of the Halbach type known to persons skilled in the art. According to this configuration, between two consecutive magnetic poles N and S of the magnetised structure, the angle between the direction of magnetisation of the structure and the radial direction F1 varies in a monotonous and discontinuous manner, without angular turning back. This document also shows (FIGS. 6 to 23) modes for securing of the magnets, in particular by means of lugs. For further details reference should be made to this document.

More specifically (FIG. 12) inside the head 4 for stoppage of flow, the stator 2 comprises magnets 56a which have magnetisation with a radial direction F1 which defines the six poles of the machine, of which there are three north poles N and three south Poles S opposite the interior of the rotor 2. The poles alternate circumferentially.

In the embodiment in FIGS. 9a, 9b and 13a, between two consecutive magnets 56a there arranged three permanent magnets as follows:
- a magnet 56b with a substantially ortho-radial direction of magnetisation F2 which is perpendicular to the direction F1; and
- on both sides of this magnet 56b, two magnets 56c which have a direction of magnetisation different from the radial and ortho-radial directions. In the example concerned, the direction of magnetisation is substantially regular within each magnet, and forms together with the radial direction F1 an angle of approximately 45°.

A structure of this type makes it possible to concentrate the magnetic energy towards the air gap E, between the rotor 2 and the stator 3, which corresponds to a significant reduction of the induction on the exterior of the magnetised structure, and a significant increase of the induction towards the interior, where the armature is located.

The invention can also be implemented with a stator 3 which has a modified Halbach structure shown in FIG. 13b.

In this structure, the magnets 56a which have a radial direction of magnetisation occupy a radial region Zr which is more extensive than those Zr' occupied by the other magnets 56b, 56c which have a non-radial direction of magnetisation, and assure the transition of the direction of the field between two successive radial regions 56a.

In this embodiment, the number of angular transitions between two successive magnets 56a with a radial direction of magnetisation is equal to 3, with one magnet 56b having an ortho-radial direction of magnetisation, and magnets 56c which are situated on both sides having a direction of magnetisation other than radial or ortho-radial. The direction of magnetisation forms together with the radial direction F1 an angle of approximately 45°. As a variant, the number of angular transitions between two consecutive poles of the machine could be different from 3.

This results in a localised transition Halbach effect between the regions 56a of radial magnetisation, on which there is superimposed a radial magnetisation system which makes it possible to optimise the passage of flow towards the conductors 36 of the rotor 2 of the electrical machine.

The permanent magnets have identical dimensions, such that the magnetised structure has a thickness P measured according to the direction F1 which is substantially constant when displacement on the circumference F3 takes place. The magnets 56a-56c are preferably of the NdFeB type, which makes it possible to reduce by half the useful thickness of a conventional Halbach inductor. It is thus possible to increase the diameter of the rotor 2 in order to go from the radius R2 to the Radius R1, so as to compensate for the low electromagnetic engine torque due to the elimination of the iron in the rotor 2.

In this case, each magnet 56a-56c has a single particular direction of magnetisation, these magnets advantageously being anisotropic. Alternatively, magnetics with isotropic properties are used, each of which has a plurality of directions of magnetisation, the angular proportion Zr, Zr' of the magnetised regions being maintained.

Figure 14:
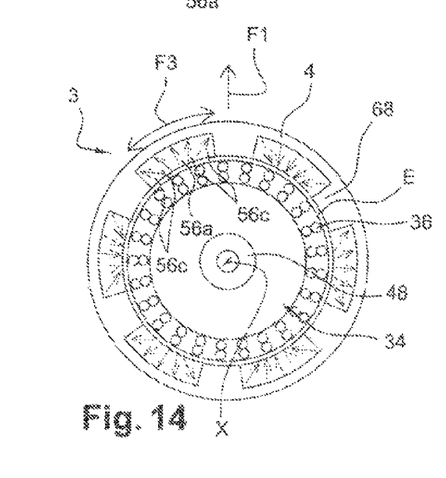
FIG. 14: a schematic representation of a stator according to the invention comprising a modified Halbach comprising steel interpolar parts interposed between two successive poles of the machine.

As a variant, in order to increase the armature inductance, it is possible to interpose steel interpolar parts 68 radially between two successive poles of the stator 3. The areas of magnetic transition 56c between two successive poles are then situated on both sides of the interpolar parts 68. In one example, the interpolar parts 68 are positioned in the place of the ortho-radial magnetisation regions 56b of a Halbach structure.

Figure 15:
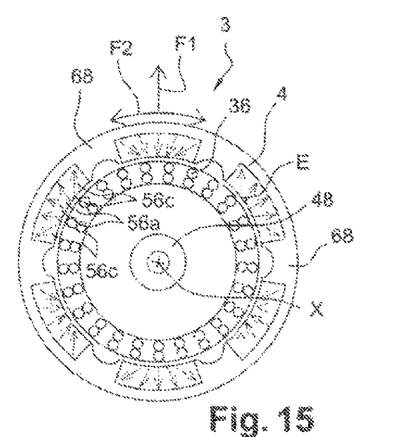
FIG. 15: a schematic representation of a variant of FIG. 14 wherein the interpolar parts are in the form of an arch.

The interpolar parts have a parallelepiped structure, but they could alternatively have the form of an arch, as shown in FIG. 15.

A configuration of this type also makes it possible to compensate for the excessively low level of electromagnetic engine torque which is due for example to the elimination of the iron in the rotor 2.

It is understood that it is possible to use other rare earth magnets, for example based on samarium cobalt.

It will be appreciated that when the body 34 has an inner set of metal plates 48, the magnetic field is directed perpendicularly to the conductors. In embodiments of the modified Halbach type, part of the flow passes via the head 4, whereas with a conventional Halbach inductor virtually no flow passes via the head 4.

It is understood that the present invention is not limited to the embodiments described.

All the combinations are possible. Thus, the grooves 50 in FIG. 11 can be replaced by protuberances of the type which intervene between the shaft 2.1 and the inner part 48. These protuberances can therefore consist of projecting lugs obtained from the outer periphery of the inner part 48. According to one embodiment, these lugs are in the form of a "T". As a variant, these lugs are configured to delimit mortices belonging to a dovetail assembly. As a variant, the part 48 has on its outer periphery recesses, such as notches of the half-closed type, in order to retain the inner periphery of the outer part 49, with the plastic material penetrating into the recesses. In general, the production of the inner part 48 in the form of a set of metal plates makes it possible to produce by cutting out protuberances or recesses with different forms for anchorage of the inner periphery outer part 49 on the outer periphery inner part 48. The inner part 48 thus preferably comprises anchorage means in order to retain the outer part 49.

In all cases, the inner part 48 has a central hole for passage of the shaft 2.1. The assembly of the part 48 with the shaft is carried out in the aforementioned manner.

Preferably, the outer part has a narrow thickness for better passage of the magnetic flow.

The invention claimed is:

1. A rotary electrical machine comprising:
a rotor (2) fitted on a metal shaft (2.1) comprising a body (34) on an outer periphery of which there are installed conductors (36) forming a winding of the rotor (2); and
a stator (3) positioned around the rotor (2) and comprising a magnetised structure with permanent magnetisation, which extends according to a circumference of the stator (3), the rotor (2) and the stator (3) being separated by an air gap (E),
wherein the body (34) of the rotor (2) is made partially of plastic material and comprises an inner part (48) in the form of a set of metal plates and an outer part (49) made of plastic over-moulded around the set of metal plates (48) so as to completely cover the set of metal plates (48), and
wherein the conductors (36) are embedded in the plastic of the outer part (49) of the rotor body (34), wherein the conductors are on an outer radial surface of the inner part (48) of the rotor body (34).

2. The machine according to claim 1, wherein the body (34) of the rotor is made of plastic material in the region of teeth separated by notches (41) close to the air gap (E), on the outer periphery of the rotor (2).

3. The machine according to claim 2, wherein the set of metal plates (48) comprises on an outer periphery thereof anchorage means in order to retain the outer part (49) made of plastic.

4. The machine according to claim 3, wherein the outer part made of plastic material (49) has at each f axial end thereof a rim extending radially inwardly in the direction substantially perpendicular to the axis (X) of the rotor (2), with the inner set of metal plates (48) being sandwiched between the rims, such that the outer part (49) is blocked axially by the set of metal plates so as to form a brace between the rims.

5. The machine according to claim 4, wherein the conductors (36) are positioned in a single layer.

6. The machine according to claim 1, wherein the conductors (36) have a transverse cross-section with an elongate form.

7. The machine according to claim 6, wherein the cross-sections of the conductors (36) have a large dimension (47) that is oriented radially.

8. The machine according to claim 7, wherein the conductors (36) are positioned staggered on the outer periphery of the rotor (2).

9. The machine according to claim 6, wherein the conductors are situated side by side as far as possible from the axis of rotation, in order to form a sheet of current on the outer periphery of the rotor (2).

10. The machine according to claim 9, wherein the rotor is PEEK (polyether ether ketone) plastic.

11. The machine according to claim 10, wherein the stator (3) is constituted by a head (4) for stoppage of magnetic flow and by an assembly of rare earth permanent magnets (54, 56) which have a radial direction of magnetisation.

12. The machine according to claim 10, wherein the stator (3) comprises:
magnetised regions (56a) having magnetisation with a radial direction (F1) which defines the poles of the machine; and
regions of magnetic transition (56b, 56c) having a direction of magnetisation other than radial which are situated between two of the magnetised regions (56a) of radial magnetisation;
the magnetised regions (56a) of radial magnetisation occupying a radial zone (Zr) which is more extensive than radial zones (Zr') occupied by the regions of magnetisation (56b, 56c) other than radial magnetisation.

13. The machine according to claim 12, wherein, between two consecutive magnets of the magnetised regions (56a) having radial magnetisation, the regions of magnetisation other than radial are constituted by:
a region (56b) of magnetisation which is substantially ortho-radial (F2); and
two regions (56c) on both sides of the region (56b), the two regions (56c) having a direction of magnetisation different from the radial and ortho-radial directions.

14. The machine according to claim 13, wherein the stator (3) additionally comprises steel interpolar parts (68) interposed radially between two successive poles of the stator (3).

15. A starter equipped with an electrical machine according to claim 1.

16. A rotary electrical machine comprising:
- a rotor (2) fitted on a metal shaft (2.1) comprising a body (34) on an outer periphery of which there are installed conductors (36) forming a winding of the rotor (2); and
- a stator (3) positioned around the rotor (2) and comprising a magnetised structure with permanent magnetisation, which extends according to a circumference of the stator (3), the rotor (2) and the stator (3) being separated by an air gap (E);
- the body (34) of the rotor (2) is made partially of plastic material and comprises an inner part (48) in the form of a set of metal plates and an outer part (49) made of plastic over-moulded around the set of metal plates (48);
- the body (34) of the rotor is made of plastic material in the region of teeth separated by notches (41) close to the air gap (E), on the outer periphery of the rotor (2);
- the set of metal plates (48) comprises on an outer periphery thereof anchorage means for retaining the outer part (49) made of plastic;
- the outer part made of plastic material (49) has at each axial end thereof a rim extending radially inwardly in the direction substantially perpendicular to the axis (X) of the rotor (2), with the inner set of metal plates (48) being sandwiched between the rims, such that the outer part (49) is blocked axially by the set of metal plates so as to form a brace between the rims;
- the conductors (36) are positioned in a single layer, embedded in the plastic of the rotor body (34), and situated side by side as far as possible from the axis of rotation, in order to form a sheet of current on the outer periphery of the rotor (2);
- the conductors (36) have a transverse cross-section with an elongate form;
- the rotor is PEEK (polyether ether ketone) plastic;
- the stator (3) comprises
  - magnetised regions (56a) having magnetisation with a radial direction (F1) which defines the poles of the machine;
  - regions of magnetic transition (56c) having a direction of magnetisation other than radial which are situated between two of the magnetised regions (56a) of radial magnetisation; and
  - steel interpolar parts (68) interposed radially between two successive poles of the stator (3);
- the magnetised regions (56a) of radial magnetisation occupying a radial zone (Zr) which is more extensive than radial zones (Zr') occupied by the regions of magnetisation (56c) other than radial magnetisation;
- the regions of magnetisation other than radial situated between two consecutive magnets of the magnetised regions (56a) having radial magnetisation, include two of the magnetic transition regions (56c) on both sides of each of the steel interpolar parts (68) having a direction of magnetisation different from the radial and ortho-radial directions.

* * * * *